United States Patent [19]

Sawamoto

[11] Patent Number: 4,483,294
[45] Date of Patent: Nov. 20, 1984

[54] ENGINE CONTROL SYSTEM
[75] Inventor: Kunifumi Sawamoto, Yokosuka, Japan
[73] Assignee: Nissan Motor Company, Limited, Yokohama, Japan
[21] Appl. No.: 351,900
[22] Filed: Feb. 24, 1982
[30] Foreign Application Priority Data Mar. 5, 1981 [JP] Japan .................................. 56-31512

[51] Int. Cl.³ ............................................. F02P 5/10
[52] U.S. Cl. ................................................. 123/417
[58] Field of Search ............... 123/416, 417, 478, 480, 123/488, 492, 493, 494, 415

[56] References Cited
U.S. PATENT DOCUMENTS

| | | | |
|---|---|---|---|
| 3,969,614 | 7/1976 | Moyer et al. | 123/417 |
| 4,262,644 | 4/1981 | Walker et al. | 123/416 |
| 4,286,560 | 9/1981 | Sagisaka et al. | 123/417 |
| 4,322,800 | 3/1982 | Hisegawa et al. | 123/417 |
| 4,368,705 | 1/1983 | Stevenson et al. | 123/416 |

Primary Examiner—Parshotam S. Lall
Assistant Examiner—W. R. Wolfe
Attorney, Agent, or Firm—Schwartz, Jeffery, Schwaab, Mack, Blumenthal & Koch

[57] ABSTRACT

An engine control system is disclosed which employs first and second load sensors providing an inference of engine load by measuring first and second engine operating parameters. The system controls one or more engine operating functions based on a measurement on the first engine operating parameter but on a measurement on the second engine operating parameter when the change of the measurement of the first engine operating parameter is out of a predetermined range.

10 Claims, 7 Drawing Figures

FIG.3

IGNITION TIMING (°BTDC)

| P_B(−mmHg) \ N(r.p.m) | 610 | 560 | 510 | 460 | 410 | 360 | 310 | 260 | 210 | 160 | 110 | 60 | 10 | −50 | −50 | −50 |
|---|---|---|---|---|---|---|---|---|---|---|---|---|---|---|---|---|
| 600 | 10 | 10 | 10 | 10 | 10 | 20 | 20 | 16 | 12 | 6 | 1 | 1 | 1 | 1 | 1 | 1 |
| 800 | 10 | 10 | 10 | 10 | 10 | 20 | 20 | 16 | 12 | 6 | 1 | 1 | 1 | 1 | 1 | 1 |
| 1000 | 11 | 11 | 11 | 24 | 24 | 26 | 24 | 22 | 19 | 15 | 11 | 2 | 1 | 1 | 1 | 1 |
| 1200 | 24 | 24 | 24 | 26 | 35 | 28 | 24 | 24 | 24 | 24 | 16 | 4 | 1 | 1 | 1 | 1 |
| 1400 | 28 | 28 | 31 | 36 | 34 | 35 | 32 | 30 | 29 | 24 | 20 | 8 | 3 | 3 | 3 | 3 |
| 1500 | 32 | 34 | 40 | 49 | 50 | 37 | 35 | 32 | 29 | 24 | 19 | 9 | 7 | 7 | 7 | 7 |
| 1600 | 40 | 42 | 47 | 49 | 49 | 48 | 44 | 40 | 34 | 25 | 20 | 11 | 9 | 9 | 9 | 9 |
| 1800 | 48 | 53 | 55 | 49 | 48 | 48 | 50 | 50 | 41 | 29 | 24 | 13 | 12 | 12 | 12 | 12 |
| 2000 | 48 | 53 | 53 | 50 | 50 | 50 | 50 | 50 | 41 | 33 | 26 | 17 | 15 | 15 | 15 | 15 |
| 2400 | 48 | 53 | 53 | 53 | 54 | 54 | 49 | 41 | 36 | 32 | 22 | 18 | 16 | 16 | 16 | 16 |
| 2800 | 54 | 54 | 54 | 47 | 41 | 40 | 40 | 36 | 35 | 28 | 26 | 24 | 22 | 22 | 22 | 22 |
| 3200 | 54 | 54 | 54 | 50 | 46 | 46 | 43 | 37 | 34 | 29 | 29 | 26 | 25 | 25 | 25 | 25 |
| 3600 | 57 | 57 | 57 | 51 | 47 | 46 | 35 | 35 | 30 | 30 | 29 | 27 | 26 | 26 | 26 | 26 |
| 4000 | 57 | 57 | 57 | 51 | 47 | 47 | 40 | 40 | 30 | 30 | 30 | 30 | 30 | 30 | 30 | 30 |
| 4800 | 58 | 58 | 58 | 51 | 49 | 49 | 45 | 41 | 33 | 33 | 33 | 30 | 30 | 30 | 30 | 30 |
| 5600 | 59 | 59 | 59 | 52 | 50 | 50 | 43 | 41 | 34 | 34 | 34 | 33 | 33 | 33 | 33 | 33 |

FIG.4

IGNITION TIMING (°BTDC)

| N (r.p.m) \ TVO (deg) | 9 | 11 | 13 | 16 | 19 | 22 | 25 | 28 | 30 | 35 | 40 | 45 | 50 | 60 | 70 | 79 |
|---|---|---|---|---|---|---|---|---|---|---|---|---|---|---|---|---|
| 600 | 16 | 10 | 10 | 5 | 4 | 4 | 4 | 4 | 4 | 4 | 4 | 4 | 4 | 4 | 4 | 3 |
| 800 | 16 | 10 | 10 | 5 | 4 | 4 | 4 | 4 | 4 | 4 | 4 | 4 | 4 | 4 | 4 | 3 |
| 1000 | 16 | 18 | 23 | 15 | 14 | 14 | 13 | 10 | 9 | 7 | 7 | 7 | 7 | 7 | 7 | 6 |
| 1200 | 16 | 25 | 35 | 24 | 24 | 24 | 21 | 15 | 14 | 10 | 10 | 10 | 10 | 9 | 9 | 9 |
| 1400 | 16 | 31 | 36 | 35 | 30 | 27 | 24 | 21 | 18 | 16 | 14 | 14 | 14 | 13 | 13 | 12 |
| 1500 | 16 | 40 | 49 | 40 | 33 | 27 | 29 | 21 | 18 | 16 | 14 | 14 | 14 | 13 | 13 | 12 |
| 1600 | 16 | 46 | 46 | 47 | 49 | 44 | 38 | 23 | 20 | 19 | 18 | 17 | 16 | 15 | 14 | 14 |
| 1800 | 16 | 47 | 47 | 48 | 49 | 42 | 47 | 31 | 28 | 23 | 20 | 20 | 19 | 17 | 16 | 16 |
| 2000 | 16 | 48 | 48 | 48 | 48 | 40 | 49 | 38 | 35 | 27 | 22 | 22 | 21 | 19 | 18 | 17 |
| 2400 | 16 | 52 | 52 | 52 | 52 | 54 | 41 | 40 | 36 | 33 | 28 | 23 | 23 | 22 | 21 | 21 |
| 2800 | 16 | 53 | 53 | 53 | 53 | 46 | 47 | 40 | 39 | 35 | 31 | 28 | 26 | 26 | 25 | 25 |
| 3200 | 16 | 51 | 51 | 51 | 51 | 51 | 50 | 46 | 44 | 37 | 33 | 30 | 29 | 27 | 26 | 25 |
| 3600 | 16 | 56 | 56 | 56 | 56 | 56 | 53 | 47 | 46 | 43 | 38 | 34 | 30 | 29 | 27 | 27 |
| 4000 | 16 | 53 | 53 | 53 | 53 | 53 | 52 | 49 | 47 | 47 | 42 | 35 | 33 | 30 | 29 | 28 |
| 4800 | 16 | 52 | 52 | 52 | 52 | 52 | 52 | 52 | 50 | 49 | 49 | 40 | 32 | 32 | 31 | 30 |
| 5600 | 16 | 52 | 52 | 52 | 52 | 52 | 52 | 52 | 52 | 50 | 43 | 41 | 35 | 34 | 33 | 33 |

ENGINE CONTROL SYSTEM

BACKGROUND OF THE INVENTION

This invention relates to a system for controlling an internal combustion engine and, more particularly, to a microprocessor-based electronic engine control system responsive to one or more sensed engine operating parameters for controlling one or more of such engine operating functions as, for example, fuel injection, ignition timing, EGR control, and the like.

Many of engine operating functions such as fuel injection, ignition timing, EGR control, and the like have been controlled based on engine load. A true indication of engine load may be obtained by the measurement of both engine speed and output torque, but a satisfactory sensor for measuring engine output torque is not available at this time. Because of this, it is the common practice to employ a single load sensor which provides an inference of engine load be sensing the absolute pressure within the engine intake manifold, the flow of air to the engine, or the angular position of the throttle valve. With engine control systems employing a single load sensor, however, a failure in such a load sensor will leads to a failure to perform proper engine operating function control, causing engine troubles.

The present invention provides an improved engine control system employing first and second load sensors which provide an inference of engine load by measuring first and second engine operating parameters. The system controls one or more engine operating functions based normally on the measurement of the first engine operating parameter but based on the measurement of the second engine operating parameter when the first engine operating parameter varies out of a predetermined range.

SUMMARY OF THE INVENTION

There is provided, in accordance with the present invention, a system for use with an internal combustion engine for controlling at least one engine operating function in response to engine operating parameters. The system comprises means for measuring a first engine operating parameter to provide an inference of engine load, means for measuring a second engine operating parameter to provide an inference of engine load, means for controlling the engine operating function, and a digital computer for calculating a valve corresponding to a setting of the means for controlling the engine operating function. The digital computer calculates a difference between measurements made at uniform time intervals on the first engine operating parameter. The digital computer calculates a value corresponding to a setting of the engine operating function control means from a measurement on the first engine operating parameter but calculates that value from a measurement on the second engine operating parameter when the calculated difference is out of a predetermined range.

The system may be used to control ignition timing in terms of spark advance. In this case, the system comprises means for measuring engine operating parameters including intake-manifold vacuum pressure, throttle-valve angular position, and engine speed, and means for controlling the spark advance, and a digital computer for calculating a value corresponding to a setting of the spark advance control means. The digital computer calculates a difference between measurements made at uniform time intervals on intake-minifold vacuum pressure. The digital computer normally calculates a value corresponding to a setting of the spark advance control means from measurements of engine speed and intake-manifold vacuum pressure but calculates that value from measurements of engine speed and throttle-valve angular position when the calculated difference between measurements is out of a predetermined range.

Preferably, the digital computer calculates a difference between measurements made at uniform time intervals on throttle-valve angular position and calculates a value corresponding to a setting of the spark advance control means from measurements on engine speed and intake-manifold vacuum pressure, regardless of the calculated difference between the intake-manifold vacuum pressure measurements, when the calculated difference between the throttle-valve angular position measurements exceeds a predetermined value.

BRIEF DESCRIPTION OF THE DRAWINGS

The details as well as other features and advantages of this invention are set forth below and are shown in the accompanying drawings, in which:

FIG. 3 illustrates a look-up table identifying an appropriate spark advance before the top dead center position as a function of intake-manifold vacuum pressure and engine speed;

FIG. 4 illustrates a look-up table identifying an appropriate spark advance before the top dead center position as a function of throttle-valve angular position and engine speed;

Figure 7:
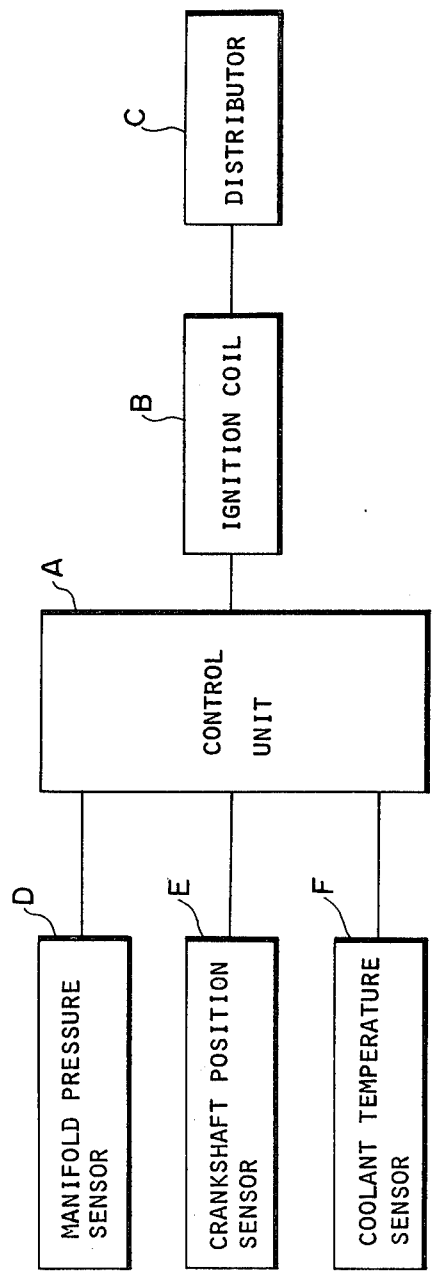
FIG. 7 is a schematic view showing a conventional engine control system.

With reference now to the conventional spark timing control system shown in the PRIOR ART figure (FIG. 7), the control unit A produces an appropriate spark timing to switch off the current through the primary winding of an ignition coil B, causing spark firing energy to be developed to fire an appropriate spark plug through a distributor C. The control unit A calculates an appropriate spark advance as a function of intake-manifold vacuum pressure and engine speed. For this purpose, the control unit A has inputs from an intake-manifold pressure sensor D and a crankshaft position sensor E. The calculated spark advance is corrected for the cylinder-head coolant temperature sensed by a temperature sensor F. With such a conventional engine control system, however, a failure or breakdown in the intake-manifold pressure sensor will result in failure to obtain an appropriate spark advance, causing engine output torque drop and engine knock. Furthermore, large pulsations in the air flow to the engine at or near full throttle conditions subjects the calculated spark advance to variations with the pulsations, causing engine output torque variations, engine knock, and increased exhaust emissions.

DETAILED DESCRIPTION OF THE INVENTION

Figure 1:
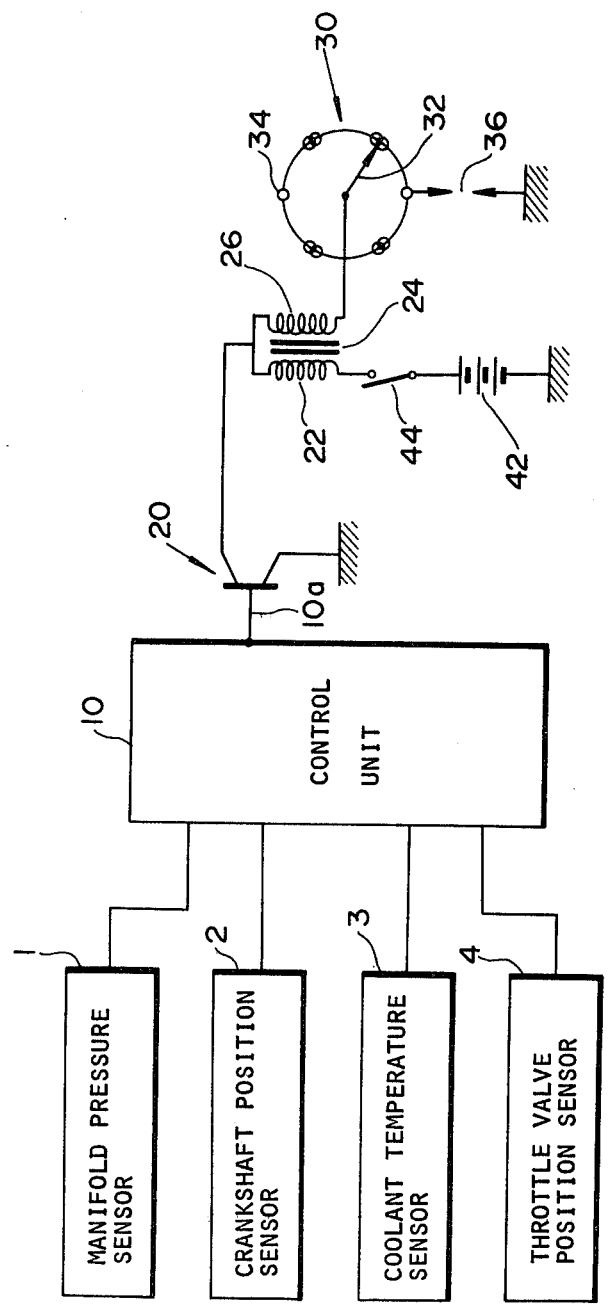
FIG. 1 is a schematic diagram showing one embodiment of an engine control system made in accordance with the present invention.

Turning now to FIG. 1, there is illustrated one embodiment of an engine control system made in accordance with the present invention. While the present invention is hereinafter described in detail in connection with its application to the control of ignition-system spark timing in terms of spark advance, it is to be noted that the general principles and teachings of the present invention could be readily applied to the control of other engine operating functions such as fuel injection, EGR control, and the like.

The engine control system has a control unit 10 which includes a digital computer comprised of a central processing unit, a read only memory, and a read/write memory. The digital computer performs calculations, based upon various conditions of the engine that are sensed during engine operation, to determine an appropriate spark advance.

The control unit 10 has various inputs from a manifold pressure sensor 1, a crankshaft position sensor 2, a temperature sensor 3, and a throttle-valve position sensor 4. The manifold pressure sensor 1 generates a signal indicative of the intake-manifold vacuum pressure within the engine intake manifold. The crankshaft position sensor 2 generates a series of pulses, the repetition rate of which is directly proportional to engine speed in terms of engine crankshaft speed. The temperature sensor 3 generates a signal indicative of cylinder-head coolant temperature. The throttle-valve position sensor 4 generates a signal indicative of the angular position of the throttle valve.

The digital computer reads the signals applied thereto from the sensors into the computer memory at uniform time intervals. The spark advance is calculated normally from a relationship defining spark advance as a function of engine speed and intake-manifold vacuum pressure and corrected for the cylinder-head coolant temperature. The digital computer also calculates the change of the intake-manifold vacuum pressure by subtracting the previous intake-manifold vacuum pressure value from the present intake-manifold vacuum pressure value. If the resulting difference is within a range defined by predetermined upper and lower limits, the manifold pressure sensor 1 and the associated circuit are considered as in operating order. If the resulting difference is out of the range, the digital computer calculates the spark advance from a relationship describing spark advance as a function of engine speed and throttle-valve angular position instead of intake-manifold vacuum pressure. An intake-manifold vacuum pressure change smaller than the predetermined lower limit is considered as an indication of failure or breakdown of the manifold pressure sensor 1 and/or the associated circuit. An intake-manifold vacuum pressure change greater than the predetermined upper limit indicates very great pulsations in the air flow to the engine. For normal engines, the upper and lower limits may be set at 50 mmHg and 10 mmHg, respectively.

In addition, the digital computer calculates the change of the throttle-valve angular position by subtracting the previous throttle-valve angular-position value from the present throttle-valve angular-position value. If the resulting difference is greater than a reference value, the digital computer calculates the spark advance based on the measurement of both engine speed and intake-manifold vacuum pressure, regardless the degree of change of the intake-manifold vacuum pressure. An throttle-valve angular-position change greater than the reference value indicates a transition condition.

The control unit 10 generates an electronic spark timing output 10a which changes to a high state in accordance with the calculated appropriate spark advance value. The spark timing output 10a is coupled to a switching transistor 20 connected with the primary winding 22 of an ignition coil 24. The secondary winding 26 of the ignition coil 24 is connected to the rotor contact 32 of a distributor 30 which sequentially connects contacts 34 to respective spark plugs, one of which is illustrated as 36. The primary winding 22 of the ignition coil is connected to the positive side of the vehicle battery 42 through an ignition switch 44. The transistor 20 is switched on and off to cause spark firing energy to be developed to fire the spark plugs of the engine. The transistor 20 is turned on when the output of the control unit 10 returns from the low state to a high state and is switched off when the output of the control unit 10 returns to the high state at which time the particular spark plug selected by the distributor 30 is fired.

Figure 2:
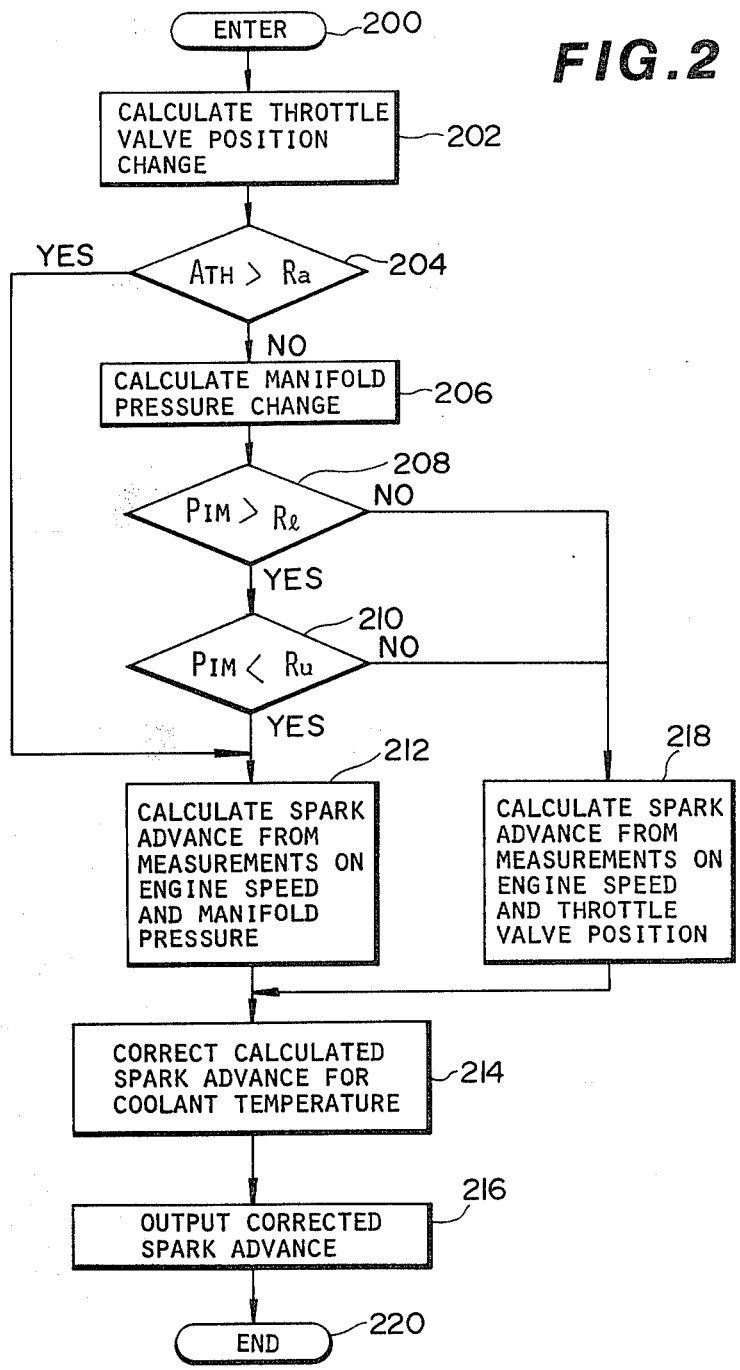
FIG. 2 is a flow diagram illustrating the programming of the digital computer used in the control unit of FIG. 1 for calculating a value corresponding to a setting of controlled variable injection timing.

FIG. 2 is a flow diagram illustrating the programming of the digital computer as it is used to control spark timing in terms of spark advance before the top dead center position of each engine piston. During engine operation, the selected engine operating parameters including intake-manifold vacuum pressure, throttle-valve angular position, engine speed and engine coolant temperature are repetitively read into the computer memory at uniform time intervals.

The computer program is entered at a point 200. At the point 202 in the program, the digital computer central processing unit calculates a value $\Delta A_{TV}$ for the change of the throttle-valve angular position. Thereafter, the program proceeds to a determination step at a point 204. The determination is whether or not the calculated throttle-valve angular-position change $\Delta A_{TV}$ is greater than the reference value Ra. If the answer to this question is no, the program preceeds to a point wherein the change $\Delta P_{IM}$ of the intake-manifold vacuum pressure is calculated. At the point 208, a determination is made as to whether or not the calculated intake-manifold vacuum pressure change $\Delta P_{IM}$ is greater than the lower limit Rl. If the answer to this question is yes, then at the point 210, another determination is made as to whether or not the calculated intake-manifold vacuum pressure change $\Delta P_{IM}$ is smaller than the upper limit Ru. If the answer to this question is yes, the program proceeds to the point 212 wherein the spark advance is calculated from a relationship defining spark advance as a function of engine speed and intake-manifold vacuum pressure. At the point 214, the calculated spark advance is corrected for the sensed engine coolant temperature. Following this, the program proceeds to a point 216 wherein the corrected spark advance is outputted and then to an end point 220.

If the answer to the question at the determination point 208 or at the determination point 210 is no, then the program proceeds to a point 218 wherein the spark advance is calculated from a relationship describing spark advance as a function of engine speed and throttle-valve angular position. Following this, the program proceeds to the point 214 wherein the calculated spark advance is corrected for the sensed engine coolant temperature and then to the point 216 wherein the corrected spark advance is outputted.

If the answer to the question at the determination point 204 is yes, the program proceeds to the point 212 wherein the spark advance is calculated from a relationship defining spark advance as a function of engine speed and intake-manifold vacuum pressure. Following this, the program proceeds to the point 214 wherein the calculated spark advance is corrected for the sensed engine coolant temperature and then to the point 216 wherein the corrected spark advance is outputted.

FIG. 3 illustrates a look-up table which identifies an appropriate ignition timing (degree) before the top dead center position of each engine piston as a function of intake-manifold vacuum pressure $P_B$ (−mmHg) and engine speed N (rpm). FIG. 4 illustrates a look-up table which identifies an appropriate ignition timing (degree) before the top dead center position of each engine piston as a function of throttle-valve angular position (degree) and engine speed N (rpm). The look-up tables may be obtained experimentally or derived empirically. The look-up tables are stored in the read only memory. The spark advance is normally calculated based on data in the spark advance table of FIG. 3 and is calculated based on the data in the spark advance table of FIG. 4 when the change of the measurement of intake-manifold vacuum pressure is out of the predetermined range.

Figure 5:
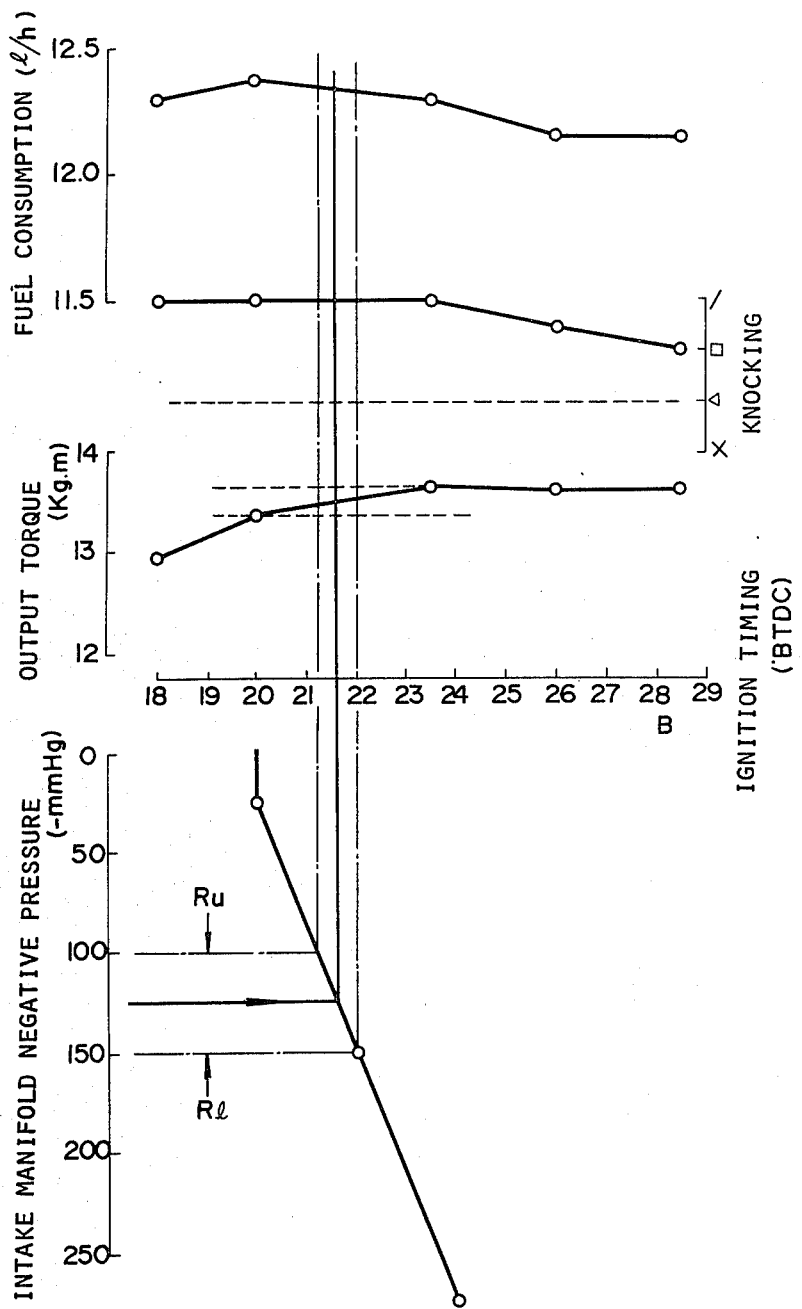
FIGS. 5 and 6 are graphs showing changes in fuel consumption, engine output torque, and engine knock with respect to spark advance.
Figure 6:
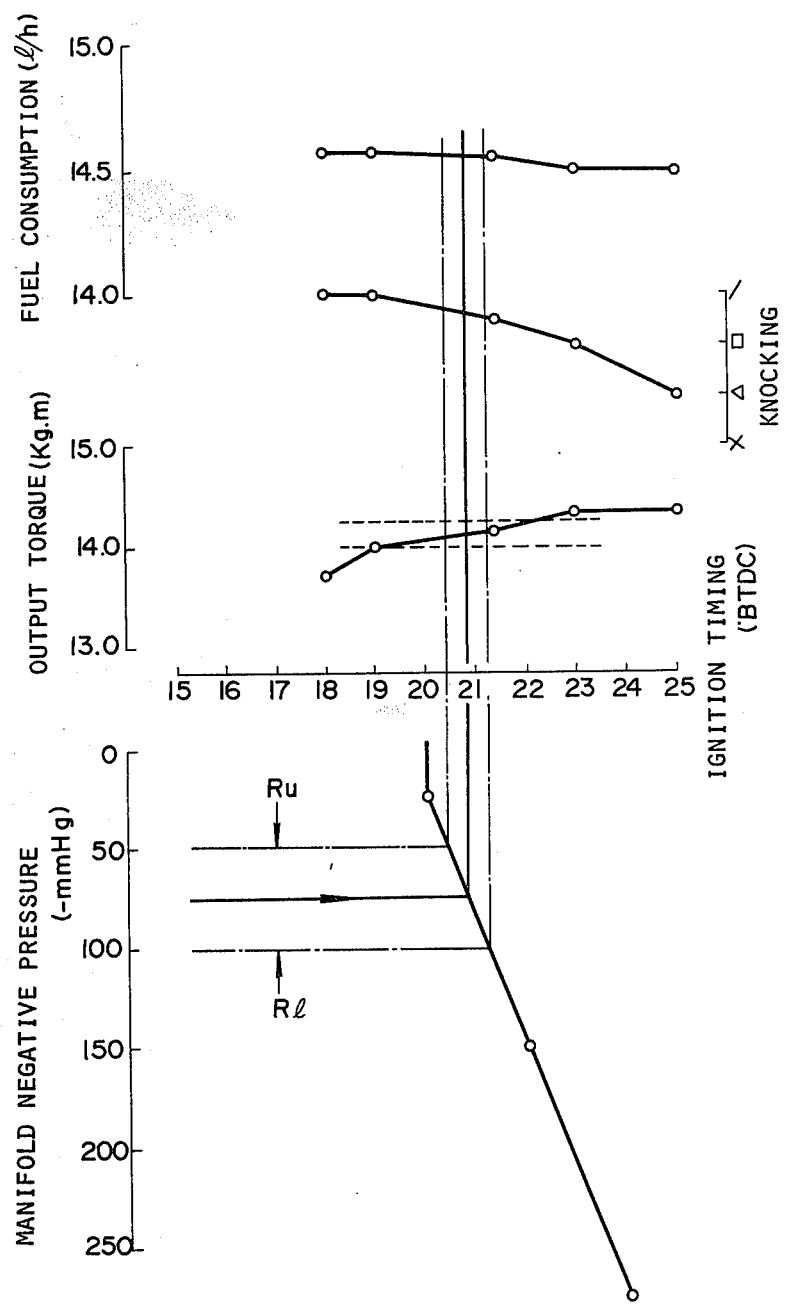

FIG. 5 illustrates changes in fuel consumption, engine output torque, and engine knock with respect to spark advance when the engine operates at 2,400 rpm with a −50 mmHg pressure developed within the engine intake manifold. FIG. 6 illustrates changes in fuel consumption, engine output torque, and engine knock with respect to spark advance when the engine operates at 2,400 rpm with the throttle valve fully opened.

The engine control system has a digital computer which calculates an appropriate spark advance from measurements on engine speed and intake-manifold vacuum pressure but from measurements on engine speed and throttle-valve angular position when a failure occurs in the manifold pressure sensor or when very great pulsations occur in the air flow to the engine. This ensures proper engine operating function control over a wide range of engine operating conditions.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A system for use with an internal combustion engine for controlling ignition timing in terms of spark advance in response to engine operating parameters, comprising:
   (a) means for measuring values of engine operating parameters including intake-manifold vacuum pressure, throttle-valve angular position, and engine speed;
   (b) means for controlling said spark advance;
   (c) a digital computer selectively employing a first group of measured values of intake-manifold vacuum pressure and engine speed or a second group of measured values of throttle-valve angular position and engine speed for calculating a value corresponding to a setting of said controlling means, said digital computer being operable to calculate a difference between sequential measurements made at uniform time intervals of the intake-manifold vacuum pressure and to determine if said calculated difference is within a predetermined range, said digital computer being further operable to calculate a value corresponding to a setting of said controlling means from said first group of measured values when said calculated intake-manifold vacuum pressure difference is within said predetermined range and for calculating a value corresponding to said setting of said controlling means from said second group of measured values when said calculated intake-manifold vacuum pressure difference exceeds said predetermined range.

2. An engine control system according to claim 1, wherein said digital computer is further operable to calculate a difference between sequential measurements made at uniform time intervals of throttle-valve angular position and to determine if said calculated throttle-valve angular position difference exceeds a predetermined value, said digital computer being further operable to calculate a value corresponding to a setting of said controlling means from said first group of measured values regardless of said calculated intake-manifold vacuum pressure difference, when said calculated throttle-valve angular position difference exceeds said predetermined value.

3. A system for use with an internal combustion engine for controlling at least one engine operating function in response to engine operating parameters, comprising:
   (a) means for measuring a first engine operating parameter to provide a first inference of engine load;
   (b) means for measuring a second engine operating parameter to provide a second inference of engine load;
   (c) means for controlling said engine operating function; and
   (d) a digital computer selectively employing one of said first and second inferences of engine load to calculate a value corresponding to a setting of said controlling means, said digital computer being operable to calculate a difference between sequential measurements made at uniform time intervals of said first engine operating parameter and to determine if said calculated difference is within a predetermined range, said digital computer being further operable to calculate a value corresponding to a setting of said controlling means from said first inference of engine load when said calculated difference is within said first predetermined range but to calculate a setting of said controlling means from said seond inference of engine load when said calculated difference exceeds said predetermined range.

4. An engine control system according to claim 3, wherein said first engine operating parameter comprises intake-manifold vacuum pressure, and said second engine operating parameter comprises throttle-valve angular position.

5. An engine control system according to claim 4, wherein said digital computer is further operable to calculate a difference between sequential measurements made at uniform time intervals of throttle-valve angular position and to determine if said calculated throttle-valve angular position difference exceeds a predetermined value, said digital computer being operable to calculate a value corresponding to a setting of said controlling means from said measured intake-manifold vacuum pressure regardless of said calculated intake-manifold vacuum pressure difference, when said calculated difference between said throttle-valve angular position measurements exceeds said predetermined value.

6. A method of controlling ignition timing for an internal combustion engine, comprising the steps of:
  measuring a first group of values of intake-manifold pressure and engine speed at generally uniform time intervals;
  measuring a second group of values of throttle position and engine speed at generally uniform time intervals;
  calculating a difference between sequentially measured values of intake-manifold pressure;
  determining whether said calculated intake-manifold pressure difference exceeds a predetermined range;
  selecting said first group of values when said calculated intake-manifold pressure difference is within said predetermined range and selecting said second group of values when said calculated intake-manifold pressure difference exceeds said predetermined range; and
  controlling ignition timing as a function of the selected group of values.

7. The method according to claim 6, further comprising the steps of determining a lower limit of said predetermined range by a value below which a failure is indicated in the step of measuring said first group of values and determining an upper limit of said predetermined range by a value above which large pulsations in the air flow to said engine are indicated.

8. The method according to claim 7, wherein the step of determining the lower limit comprises setting said lower limit value of approximately 10 mmHg and the step of determining the upper limit comprises setting said upper limit value to approximately 50 mmHg.

9. The method according to claim 6, further comprising the steps of:
  calculating a difference between sequentially measured values of throttle position;
  determining whether said calculated throttle position difference exceeds a predetermined value; and
  wherein the step of controlling further comprises controlling said ignition timing as a function of said first group of values, regardless of said calculated intake-manifold pressure difference, when said calculated throttle position difference exceeds said predetermined value.

10. The method according to claim 9, wherein said predetermined value of throttle position difference is a value above which said engine is indicated as running under a transition condition.

* * * * *